United States Patent [19]

Haldric et al.

[11] Patent Number: 4,548,591
[45] Date of Patent: Oct. 22, 1985

[54] DOUBLE UNIVERSAL JOINT WITH AN ELASTICALLY YIELDABLE TORQUE TRANSMITTING ELEMENT

[75] Inventors: Bernard Haldric; Sylvie Baudon née Chardon, both of Vendome, France

[73] Assignee: NACAM, Vendome, France

[21] Appl. No.: 488,994

[22] Filed: Apr. 27, 1983

[30] Foreign Application Priority Data

Apr. 30, 1982 [FR] France ................. 82 07571

[51] Int. Cl.⁴ .................. F16D 3/00; F16D 3/76; F16D 3/32
[52] U.S. Cl. ........................... 464/89; 464/117; 464/160; 464/180
[58] Field of Search .............. 464/75, 87, 89, 114, 464/117, 125, 147, 150, 180, 905, 134, 135, 160

[56] References Cited

U.S. PATENT DOCUMENTS

| | | | |
|---|---|---|---|
| 1,548,629 | 8/1925 | Pfander | 464/117 X |
| 1,906,057 | 4/1933 | Guy | 464/89 |
| 2,691,283 | 10/1954 | Stover | 464/180 X |
| 2,948,129 | 8/1960 | Troyer | 464/89 |
| 2,949,021 | 8/1960 | Charlesworth | 464/180 X |
| 3,137,148 | 6/1964 | Kayser | 464/89 |
| 3,263,451 | 8/1966 | Reimer | 464/89 X |
| 4,075,871 | 2/1978 | Burke | 464/117 |
| 4,430,065 | 2/1984 | Peterson | 464/150 X |

FOREIGN PATENT DOCUMENTS

| | | | |
|---|---|---|---|
| 816502 | 8/1937 | France | 464/89 |
| 1215423 | 4/1960 | France . | |
| 1561619 | 3/1969 | France . | |
| 2212871 | 7/1974 | France . | |
| 2402803 | 4/1979 | France . | |
| 2482223 | 11/1981 | France . | |
| 11308 | 5/1897 | United Kingdom | 464/117 |
| 459105 | 1/1937 | United Kingdom . | |
| 862693 | 3/1961 | United Kingdom | 464/89 |
| 2053417 | 2/1981 | United Kingdom | 464/134 |
| 2057632 | 4/1981 | United Kingdom . | |
| 2070737 | 9/1981 | United Kingdom . | |

*Primary Examiner*—Stuart S. Levy
*Assistant Examiner*—Daniel P. Stodola

[57] ABSTRACT

The double universal joint comprises two end yokes (1,2) each of which is connected by a spider element to an intermediate connecting device comprising an outer part (14) and an inner part (15) which are interconnected by an elastically yieldable element (16) interposed between the outer part and the inner part. Each of the outer and inner parts (14,15) is made from a curled and welded sheet metal blank or from a tube and includes a corresponding yoke (19,20) for connection of the part with a corresponding spider element (8,7) associated with an end yoke (1,2) of the joint.

16 Claims, 7 Drawing Figures

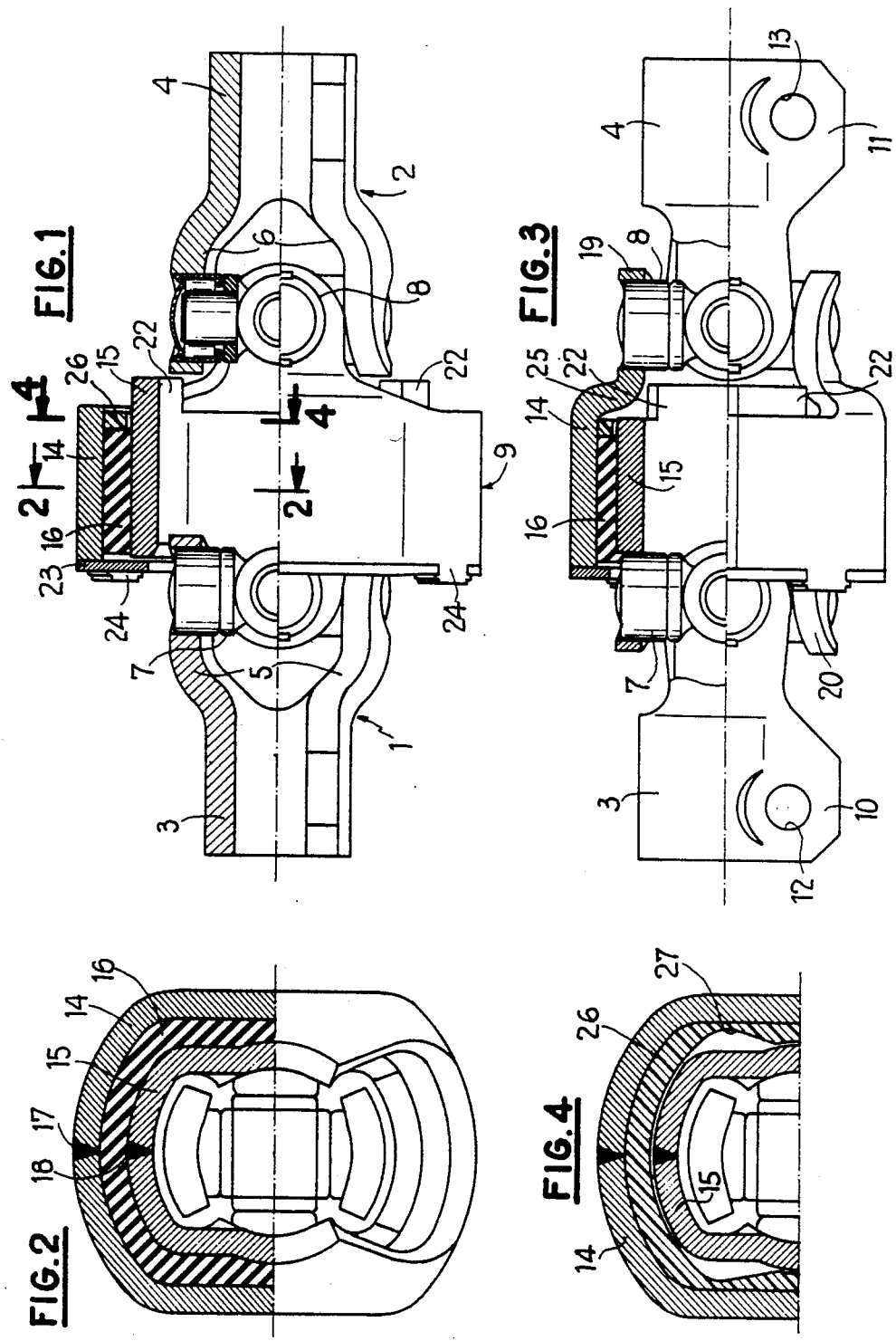

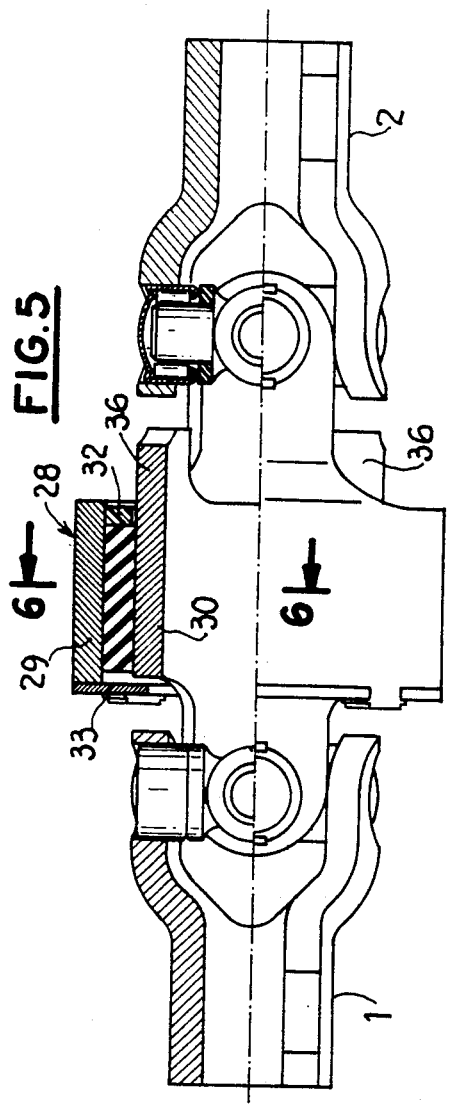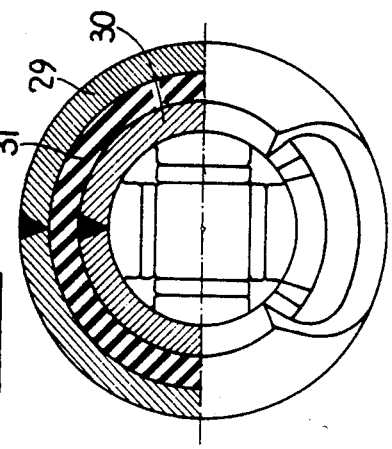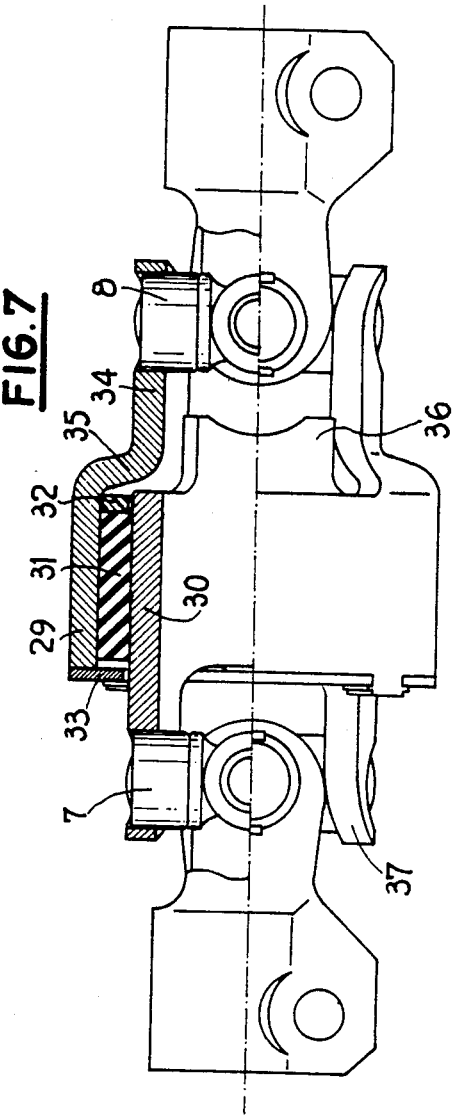

DOUBLE UNIVERSAL JOINT WITH AN ELASTICALLY YIELDABLE TORQUE TRANSMITTING ELEMENT

DESCRIPTION

The present invention relates to universal joints and more particularly to universal joints comprising an elastically yieldable torque transmitting connection.

French Pat. No. 2 167 265 filed on Jan. 11, 1972 discloses the assembly of a universal joint yoke with a shaft in which the shaft is engaged inside a sleeve of an elastomer which is radially compressed in contact with the wall of the end of the yoke forming a hub.

By means of such an arrangement there is achieved a damping of the vibrations between the shaft and the yoke and consequently between the shaft and the other shaft normally coupled with the conjugate yoke of the universal joint.

However, in order to ensure the transmission of the torque through the elastomer sleeve under good conditions, it is necessary that the sleeve be in contact, on one hand, with the wall of the hub of the yoke and, on the other hand, with the end of the corresponding shaft on a relatively great length, which increases the longitudinal size of the assembly.

Further, the end of the shaft engaged in the elastomer sleeve must have a special shape for preventing relative rotation between the shaft and the sleeve, and this involves a shaping of the end of the shaft.

Moreover, the presence of an elastically yieldable sleeve between the shaft and the hub of the yoke of the universal joint associated with the shaft has different effects on the two yokes of the joint, in particular as concerns the damping of the vibrations and the elimination of noise, so that if a homogeneous system is to be obtained, a sleeve of elastomer must be provided in the hubs of the two yokes.

This results in an increase in the cost of the assembly.

An object of the invention is to overcome the aforementioned drawbacks and to provide a universal joint which has a small longitudinal size and yet ensures the torque transmissions with an effective damping of the vibrations.

The invention therefore provides a double universal joint comprising two end yokes each connected by a spider element to an intermediate connection element having an outer part and an inner part which are interconnected by an elastically yieldable element interposed between the outer part and the inner part, wherein each of said outer and inner parts is formed from a sheet metal blank which is curled and welded or from a tube and includes, in one piece therewith, a corresponding yoke for connecting said part to a corresponding spider element associated with an end yoke of the joint.

Further features and advantages of the invention will be apparent from the ensuing description which is given solely by way of example with reference to the accompanying drawings, in which:

FIG. 1 is an elevational and semi-sectional view of the double universal joint according to the invention;

FIG. 2 is a semi-sectional view taken along line 2—2 of FIG. 1;

FIG. 3 is a top plan view and a partial semi-sectional of the double universal joint of FIG. 1;

FIG. 4 is a semi-sectional view taken along line 4—4 of FIG. 1 showing the form of the relay bearing of the double universal joint;

FIG. 5 is an elevational and semi-sectional view of another embodiment of the double universal joint according to the invention;

FIG. 6 is a semi-sectional view taken along line 6—6 of FIG. 5, and

FIG. 7 is a top plan view with a partial semi-sectional view of the universal joint of FIG. 5.

The double universal joint shown in FIGS. 1 to 4 comprises mainly a first yoke 1 and a second yoke 2 each comprising a hub 3, 4 for connection with a corresponding shaft (not shown) and respective branches 5, 6 whereby they are connected by spider elements 7, 8 to an intermediate connection element 9.

As can be seen in FIG. 3, the hubs 3 and 4 of the yokes 1 and 2 are split hubs forming clamping collars for the purpose of fixing the yokes to the corresponding shafts and having respective lateral tabs 10, 11 provided with orifices 12, 13 for the passage of tightening bolts (not shown).

The yokes 1 and 2 are advantageously made from thick sheet steel which is blanked and curled.

The intermediate connecting element 9 is formed in two parts 14, 15 which are disposed coaxially and interconnected by an elastically yieldable element 16 formed by a sleeve of elastomer. Each of the parts 14 and 15 of the intermediate connecting means 9 is made from curled and welded sheet metal. The weld beads of the parts 14 and 15 are shown respectively at 17 and 18 in FIG. 2.

As can be seen more clearly in FIG. 3, the parts 14 and 15 of the intermediate connecting means 9 each define yokes 19, 20 in the transverse bores of which are respectively engaged the trunnions of the spider elements 8 and 7, the other trunnions of which cooperate with the branches 6 and 5 of the yokes 1 and 2.

In order to ensure that the branches of the yokes 19 and 20 of the intermediate connecting means 9 are in alignment, the branches of the yoke 19 carried by the outer part 14 are pinched inwardly.

The cross-section of the outer and inner parts 14, 15 is large relative to the cross-section of the rest of the joint. Thus, there is obtained a surface of contact between the outer and inner parts 15 and the elastomer sleeve 16 which is adapted to the maximum value of the torque to be transmitted through the universal joint.

It will be understood that the elastomer sleeve 16 may be fixed to the outer part 14 and inner part 15 by bonding or vulcanization of its outer and inner surfaces of the corresponding surfaces of these parts.

It may also be fixed by vulcanization or bonding of one of its surfaces to the corresponding part 14 or 15 with which it is in contact and be a drive fit in the other part. Alternatively, it may be merely clamped between the parts 14 and 15. As can be seen in particular in FIG. 2, the outer part 14 and inner part 15 of the intermediate connecting means of the universal joint according to the invention have non-circular cross-sectional shapes, for example a curvilinear rectangular shape.

The end of the inner part 15 of the intermediate connecting means 9 opposed to the yoke 20 has diametrically opposed axially extending extensions 22 constituting rotational abutments for the inner part 15 relative to the outer part 14 and adapted to cooperate with the edges of the branches of the yoke 19 of the outer part 14.

It is also possible to provide only a single one of these axial extensions.

The extensions 22 forming rotational abutments have for purpose, depending on the choice of their angular position on the inner part 15 relative to the corresponding edges of the branches of the yoke of the outer part, to limit the torque transmitted by the elastomer sleeve 16 to a predetermined value.

They may also be disposed in positions corresponding to the limits of the torque transmitting capacity of the sleeve 16.

Thus, when the torque to be transmitted by the universal joint reaches a predetermined value or becomes such that it produces an excessive deformation of the elastomer sleeve 16, the inner part 15 engages by its projections 22 the outer part 14 so that the torque is transmitted by a driving through the metal parts themselves. In this way, the destruction of the elastomer sleeve under the effect of an excessive torque is avoided.

Adjacent to the end of the yoke 20 carried by the inner part 15, the outer part 14 has an annular member 23 constituting an axial abutment which is fixed by means of tabs 24 which are formed over or crushed and are provided on the outer part 14.

The axial abutment 23 in confronting relation to the corresponding end of the outer part 14 prevents a relative displacement between the inner part 15 and the outer part 14 in the direction in which the spider elements 7 and 8 move away from each other.

The relative displacements of these two parts 14 and 15 in the opposite direction are prevented in the same way by the shoulders 25 which result from the pinching of the branches of the yoke 19 and the outer part 14. In this way it is ensured that the sleeve 16 remains engaged with the two parts 14 and 15 of the intermediate connecting means.

As shown in FIGS. 1, 2 and 4, at one of the ends of the elastomer sleeve 16 there is provided an annular member 26 of a rigid material, for example a plastics material, which constitutes a support means which resists the complementary torque effects which appear when the double universal joint transmits high torques at large transmitting angles.

The annular member 26 is for example fixed by bonding or vulcanization to one end of the sleeve 16 with provision of a slight clearance relative to the inner part 15 of the connecting means 9.

Bearing in mind the shape of the parts 14 and 15 of the connecting means, the annular member 26 has recesses 27 shown in FIG. 4 which allow a relative angular displacement of the outer and inner parts 14 and 15.

The recesses 27 also constitute abutments the function of which is similar to that of the axial extensions 22 which may then be eliminated.

Under the conditions of transmission of high torque at a large angle indicated hereinbefore, the outer part 14 tends to move relative to the inner part 15 so that their axes are no longer coincident and this results in an axial deformation of the sleeve 16. The support means 26 prevents this axial deformation and consequently ensures that the sleeve 16 is maintained in contact with the parts 14 and 15 throughout its length.

The double universal joint shown in FIGS. 5 to 7 is similar to that described with reference to FIGS. 1 to 4, except that it comprises an intermediate connecting means 28 whose outer part 29 and inner part 30 are of cylindrical shape.

In the illustrated embodiment, the parts 29 and 30 are made from a metal sheet which is curled and welded.

They may also be made of tubes of corresponding sections.

The parts 29 and 30 are interconnected by an elastomer sleeve 31 which is also cylindrical and is either fixed to the corresponding surfaces of the parts 29 and 30 by bonding or vulcanization or fixed to one of these parts by bonding or vulcanization and fixed by means of a drive fit on or in the other part.

As before, the double universal joint shown in FIGS. 5 to 7 comprises an annular member 32 of circular shape which constitutes a support means resisting the complementary torque effects.

Further, the double universal joint of FIGS. 5 to 7 has a construction similar to that of FIGS. 1 to 4.

It has, as the latter, a first axial abutment 33 constituted by an annular member fixed to the end of the outer part 29 remote from its yoke 34 and second axial abutments 35 formed by the shoulders of the yoke 34 of the outer part 29.

The inner part 30 has extensions 36 constituting angular abutments cooperating with the corresponding branches of the yoke 34 of the outer part 29 the function of which is the same as that of the corresponding elements of the double universal joint of FIGS. 1 to 4.

The double universal joint which has just been described has, relative to joints of known type comprising a torque transmitting elastically yieldable element, the advantage of a relatively small axial overall size. Further, as the double universal joint according to the invention has an elastically yieldable torque transmitting element in the intermediate connecting means, it can be fixed by conventional fixing means common to a large number of conventional universal joints.

The fact that the elastically yieldable sleeve 16 is located in an intermediate part of the double universal joint ensures a balanced operation of the latter, in particular as concerns the damping effects on vibrations transmitted to the two end yokes of the joint.

The presence of security of torque transmission constituted by the axial projections of the inner part of the intermediate connecting means results in long life of the double universal joint according to the invention and in particular of the elastomer sleeve interconnecting the outer and inner parts of the joint.

The double universal joint just described is a joint having yokes provided with split fixing hubs. However, it will be understood that the invention is also applicable to double universal joints having different fixing means.

In the embodiments described with reference to the drawings, the double universal joint has a support means mounted at one end of the elastomer sleeve with a slight clearance relative to the inner part of the intermediate connecting means.

However, two support means may be provided each of which is fixed to one end of the elastomer sleeve. Further, the clearance may be provided relative to the outer part.

Having now described our invention what we claim as new and desire to secure by Letters Patent is:

1. A double universal joint comprising two end yokes, an intermediate connecting means comprising an outer member and an inner member and an elastically yieldable element interposed between said interconnecting the outer member and the inner member, each of said outer and inner members having a metal sheet-like wall and including, in one piece with the each member, a corresponding yoke, two spider elements pivotally connecting the corresponding yokes of the outer member and inner member to the two end yokes respectively, means for providing a rotational abutment of the inner member relative to the outer member and comprising at least one axial extension provided on said inner member and adapted to abut against a branch of the yoke of said outer member when the torque transmitted by the elastically yieldable element exceeds a predetermined value.

2. A double universal joint according to claim 1, wherein said outer member and inner member are of generally cylindrical shape.

3. A double universal joint according to claim 2, wherein said outer member and inner member have a circular cross-sectional shape.

4. A double universal joint according to claim 1, wherein said outer member and inner member have a non-circular cross-sectional shape.

5. A double universal joint according to claim 1, wherein the elastically yieldable element interposed between the outer member and inner member of the intermediate connecting means is constituted by an elastomer sleeve fixed to said members of said intermediate connecting means.

6. A double universal joint according to claim 5, wherein said elastically yieldable element is bonded to the outer and inner members.

7. A double universal joint according to claim 5, wherein said elastically yieldable element is gripped between said outer member and inner member.

8. A double universal joint according to claim 5, wherein said elastically yieldable element is vulcanized to the outer and inner members.

9. A double universal joint according to claim 1, wherein the elastically yieldable connecting element between the outer member and inner member of the intermediate connecting means is constituted by an elastomer sleeve which is fixed to one of said members and is an interference fit with the other of said members.

10. A double universal joint according to claim 1, comprising axial abutment means for preventing relative axial displacements of said inner member and outer member.

11. A double universal joint according to claim 10, wherein the axial abutment means comprises an annular member mounted on an end of said outer member of the connecting means remote from the yoke corresponding to said outer member, which annular member is in confronting relation to an adjacent end of said inner member.

12. A double universal joint according to claim 10, wherein said axial abutment means comprise shoulders on branches of the yoke of said outer member which shoulders are in confronting relation to an adjacent end of said inner member.

13. A double universal joint according to claim 1, wherein each of said outer and inner members is formed from a sheet metal blank which has been curled and welded.

14. A double universal joint according to claim 1, wherein each of said outer and inner members is formed from a tube.

15. A double universal joint comprising two end yokes, an intermediate connecting means comprising an outer member and an inner member and an elastically yieldable element interposed between and interconnecting the outer member and the inner member, each of said outer and inner members having a metal sheet-like wall and including, in one piece with the each member, a corresponding yoke, two spider elements pivotally connecting the corresponding yokes of the outer member and inner member to the two end yokes respectively, and at least one support means which resists complementary torque forces and comprises a rigid annular member disposed between said outer member and said inner member of the intermediate connecting means and fixed to at least one end of the elastically yieldable element with a slight clearance between said rigid annular member and one of said inner and outer members.

16. A double universal joint according to claim 15, wherein in respect of an intermediate connecting means having a non-circular cross-sectional shape, said rigid annular member forming a support means has recesses allowing a limited angular displacement of said inner member relative to said outer member.

* * * * *